Patented July 7, 1936

2,046,614

UNITED STATES PATENT OFFICE 2,046,614

METHOD OF PREVENTING SLIME GROWTH IN PAPER MAKING PROCESSES

Pierre Drewsen, Sandusky, Ohio, assignor to The Hinde & Dauch Paper Company, Sandusky, Ohio, a corporation of Ohio No Drawing. Application December 4, 1935, Serial No. 52,930

5 Claims. (Cl. 92—21)

The invention relates to the manufacture of paper and forms a continuation in part of my copending application for patent Serial No. 740,723, filed August 20, 1934. More particularly the invention relates to one phase in the process and consists in the means employed for keeping the system free from algae growth. Among the grades of paper to which this invention may be applicable are straw paper for corrugating purposes, corrugating paper from a chip paper furnish, chip paper, jute liner board, box board, roofing felt, absorbent papers, car lining, sheathing, and the like.

Algae growth which occurs as gelatinous accumulations in the chests, pipe lines, mixing boxes, vats, etc., of a paper mill, is known in paper making parlance as "slime". The source of algae and other slime components is generally conceded to be the water supply of the mill, although it is undoubtedly introduced into the system by means of the raw material, and also to some extent from the air. Slime consists chiefly of algae, not dissimilar from the growth which may be observed in stagnant ponds, and is intermatted with molds, yeasts, bacteria, fibre and other impurities. One of the characteristics of slime is its tendency to grow. A paper mill system which has been thoroughly cleaned may operate for twenty-four hours or so without difficulty, but after a period of time, unless measures are taken to prevent this growth, the inside of the vats of a paper machine will be found to be coated with a slippery substance. As time goes on, and the growth continues, particles of slime break off and find their way into the sheet of paper. In some instances, particularly where esthetic elements are substantially absent, the presence of slime spots is of no serious account in the sheet. For example, in straw paper, which is corrugated and sealed between two sheets of liner board, a slime spot would not be noticed, and would not weaken the fibrous structure materially. In book, writing paper, and the like, slime spots are unsightly. Under operating conditions, a slime spot in the wet web tends to adhere to the press rolls, thereby breaking the sheet and causing serious production losses. After the growth of slime reaches a certain point, it becomes necessary to shut down the paper machine for cleaning,—another loss of operating time.

The characteristic of growth, as well as a microscopic examination of slime indicates that it is composed of living organisms. The nourishment for these organisms is generally derived from the raw materials, which in paper making is mainly vegetable; for example, straw, the raw material for straw corrugating paper, contains appreciable quantities of potash, phosphorus and nitrogen—the chemical elements essential for plant growth. In straw paper mills, the washing of the cooked stock is necessarily imperfect, wherefore the mill waters must contain these elements. In addition to this, some mills use warm process water for carrying the suspended fibres to the forming wire, and thereby furnish an ideal culture medium for the growth and propagation of algae, and the other components of slime. In mills where waste paper material is used, a substantial amount of nourishment for slime organisms is present in the raw material, for example, garbage, lunch residues from office waste baskets, animal glue, label paste, and starch sizing. In roofing felt mills, fertilizer bags have been used as a raw material.

The great objection to slime, entirely apart from its unsightliness, and its possible weakening of the paper structure, and also from the paper mill production losses which it causes, is the fact that it makes a closed paper mill system impossible. By closed system is meant the re-use of mill waters, for example, returning the mill effluent for re-use in beaters, felt and mould showers, etc. A closed system would be desirable in any mill for the reason that mill effluent is one of the chief sources of fibre loss, and the best way to recover such fibre would be to re-use the water. This has been tried many times, but such attempts are generally discontinued after a few days because of the excessive slime formation which takes place. Paper making authorities have estimated that the annual loss from fibre in mill effluents amounts to several millions of dollars.

A number of remedies have been proposed to eliminate slime, but in many instances these are not uniformly successful. Chlorine gas in water solution has sufficient toxicity to kill the slime components, but in some paper making furnishes, for example, straw paper, the chlorine is relatively so active that it combines chemically with the highly lignified fibre, or the organic components of the white waters, and is consumed almost as soon as it is introduced into the system—the combination products being non-toxic to the organisms. The same is true, in a measure, of ground wood furnishes; such as, old newspapers, or similar lignified fibrous batches. To check the activity of the chlorine, it has been proposed to use chlor-amine, which is a chemical reaction product of chlorine and ammonia. This is said to prolong the action of the chlorine and thereby render its toxicity more completely available. However, the additional expense of the ammonia must be taken into consideration.

Formaldehyde has been proposed as a slime preventive and would undoubtedly be effective, could it be economically used in sufficient concentration. It is probable that any toxic agent would eliminate and prevent slime, if the price were sufficiently low, and if there were no injury to the product and no danger of contaminating neighboring streams, for no matter how effectively closed a system is, some water from the mill is bound to find its way into the nearest natural body of water. This consideration automatically rules out the use of mercury salts, for example.

One of the best known and most effective algae killers and preventives is copper sulphate. For paper mill use, however, especially in straw, corrugating, and board mills, where the machine waters are in general alkaline, copper sulphate is worthless for the reason that it can remain in solution only in neutral or acid media. Having been precipitated out of solution, the resulting copper compound is valueless as a fungicide.

I have found that the use of caustic soda or caustic potash in paper mill waters (beaters, beater chests, machine chests, and paper machine) in a concentration of not less than one pound of the caustic alkali to 10,000 pounds of water in excess of the amount of alkali necessary to neutralize the natural hardness of the water is an effective algae preventive. However, this amount may be increased up to 8 pounds or more of caustic alkali for 10,000 pounds of water, at which approximate concentration no substantial damage is done to the paper machine felts. In some cases it may be desirable to permit the caustic eventually to find its way into the sheet of paper without any attempt at neutralization, but if the nature of the product does not permit this, the caustic may be neutralized at some region close to the sheet formation by means of papermakers' alum or other acid substances.

Since it is well known that caustic alkalies deteriorate wool felts, it is undesirable to use so large an amount that this damage will take place, because it has been found that concentrations of caustic below the damage point will effectively prevent slime, serious enough to cause "pickups" at press rolls, or other breaks.

The maintenance of an alkaline condition in the machine waters is not sufficient to prevent slime, as it is well known that the mill waters in the filler vats of a board machine (by filler, we mean the unsized side of jute liner board) are alkaline, but not caustic, and that in the absence of preventive measures, slime grows freely in them.

The manner of introducing the caustic alkali is not particularly important. It may be added in solid or liquid form at any convenient point; for example, into the beaters together with the raw material, or in the jordan or machine chest. The caustic soda may be manufactured locally by boiling together lime and soda ash, and if the nature of the product permits, the reaction product of these chemicals, caustic soda and carbonate of lime, may be added together to the beaters, without first separating them by filtration. As indicated previously, the elimination of slime, or even its reduction to a point where it is not detrimental, makes it possible to re-use the mill waters, and therefore the quantity of alkali chemicals employed, not to mention size, alum, dyestuffs, clay, or other mineral fillers, etc., will be substantially limited to the quantity which actually finds its way into the final sheet of paper. The resulting economy is obvious to anyone skilled in the art of paper making.

What I claim as my invention is:

1. In a paper making process, the step of introducing caustic alkali into mill waters to an extent sufficient to inhibit the growth of biological slime formations detrimental to the operation and in a concentration of not less than one pound of the caustic alkali to ten thousand pounds of water in excess of the amount of alkali necessary to neutralize the natural hardness of the water used.

2. In a paper making process, the step of introducing alkali hydroxide in mill waters at sufficiently high concentration to render slime growth harmless, and at the same time at sufficiently low concentration to prevent appreciable injury to the wool felts of the paper machine but not less than one pound of caustic alkali to ten thousand pounds of water in excess of the amount of alkali necessary to neutralize the natural hardness of the water used.

3. In a process of manufacturing paper board, the step of introducing caustic soda into the mill waters in a concentration of not less than one pound of caustic alkali to ten thousand pounds of water in excess of the amount of alkali necessary to neutralize the natural hardness of the water used.

4. In a process of manufacturing paper which includes the re-use of mill waters, the step of maintaining a caustic alkali concentration sufficient to check at all times the growth of biological slime but not less than one pound of caustic alkali to ten thousand pounds of water in excess of the amount of alkali necessary to neutralize the natural hardness of the water used.

5. In a process of making paper from second use material, the step of inhibiting the growth of deleterious biological slime formations by introducing caustic alkali into the mill waters in a concentration of not less than one pound of caustic alkali to ten thousand pounds of water in excess of the amount of alkali necessary to neutralize the natural hardness of the water used.

PIERRE DREWSEN.